US008445567B2

United States Patent
Stevenson et al.

(10) Patent No.: US 8,445,567 B2
(45) Date of Patent: May 21, 2013

(54) METHOD FOR REDUCING PLATE-OUT OF SOLID PHOSPHITES IN POLYMERS

(75) Inventors: Donald Stevenson, Dover, OH (US); Michael Jakupca, Canton, OH (US); Nina Bersaglini, Magnolia, OH (US)

(73) Assignee: Dover Chemical Corporation, Dover, OH (US)

( * ) Notice: Subject to any disclaimer, the term of this patent is extended or adjusted under 35 U.S.C. 154(b) by 411 days.

(21) Appl. No.: 12/709,883

(22) Filed: Feb. 22, 2010

(65) Prior Publication Data

US 2010/0216923 A1 Aug. 26, 2010

Related U.S. Application Data

(60) Provisional application No. 61/154,531, filed on Feb. 23, 2009.

(51) Int. Cl.
*C08K 5/52* (2006.01)
(52) U.S. Cl.
USPC .................... 524/128; 524/140; 524/141
(58) Field of Classification Search
USPC .......................... 524/128, 141, 140
See application file for complete search history.

(56) References Cited

U.S. PATENT DOCUMENTS

2004/0164279 A1* 8/2004 Stevenson et al. ............ 252/397
2006/0173109 A1* 8/2006 Keegan et al. ................ 524/109

OTHER PUBLICATIONS

Spatafore et al., "Migration and Blooming of Stabilizing Antioxidants in Polypropylene" Polym. Engineering and Science, Nov. 1991, vol. 31, No. 22, pp. 1610-1617.*
PCT/US2010/24911 International Preliminary Report on Patentability form PCT/IB/373, dated Aug. 23, 2011.
PCT/US2010/24911 International Search Report form PCT/ISA/210.
PCT/US2010/24911 International Written Opinion Form PCT/ISA/237 dated Apr. 12, 2010.
Spatafore, et al. Migration and Blooming of Stabilizing Antioxidants in Polypropylene Polymer Engineering and Science, Aug. 26, 2004, vol. 31, Issue 22, pp. 1610-1617.

* cited by examiner

*Primary Examiner* — Robert D. Harlan
(74) *Attorney, Agent, or Firm* — Hahn Loeser & Parks LLP

(57) ABSTRACT

A process is described which reduces the amount of bloom and/or plate-out of phosphite antioxidants during polymer processing by the addition of at least one polyethylene glycol (or blends thereof) or polycaprolactones (or blends thereof) having an average molecular weight of approximately 1,000 to 20,000, most preferably between 4,000 to 10,000.

14 Claims, No Drawings

METHOD FOR REDUCING PLATE-OUT OF SOLID PHOSPHITES IN POLYMERS

TECHNICAL FIELD

The invention described herein pertains generally to a method to prevent the "migration" or "plate-out" or "bloom" of high performance or general purpose solid phosphites from polyolefins, including preferably polyethylenes, especially linear low density polyethylenes and low density polyethylenes, and polypropylene during processing and aging. More specifically the invention relates to a process to reduce the migration or plate-out of high performance solid diphosphites such as Doverphos® S-9228™ (bis(2,4-dicumylphenyl)pentaerythritol diphosphite) and solid monophosphites such as Doverphos® S-480 (tris(2,4-di-t-butylphenyl) phosphite) when blended into polyolefins. The invention is expected to have applicability to other phosphites, although to different degrees, a non-limiting list including distearyl pentaerythritol diphosphite (Doverphos® S-680), bis-(2,4-di-t-butylphenyl) pentaerythritol diphosphite (Ultranox® 626), bis-(2,6-di-t-butyl-4-methylphenyl)pentaerythritol diphosphite (PEP 36), and 2,2',2"-nitrilo[triethyl-tris[3,3',5,5'-tetra-tert-butyl-1,1'-biphenyl-2,2'-diyl]]phosphite (Irgafos® 12).

BACKGROUND OF THE INVENTION

Solid phosphites, particular high performance solid phosphites, are very good stabilizers for the processing of linear low density polyethylene ("LLDPE"), high density polyethylene ("HDPE"), low density polyethylene ("LDPE") and polypropylene ("PP"). One particular high performance solid phosphite, namely Doverphos® S-9228™ (bis(2,4-dicumylphenyl)pentaerythritol diphosphite) has proven to be a very good polymer stabilizer. (See U.S. Pat. Nos. 5,364,895; 5,438,086; 7,176,252; 6,613,823; 6,224,791; 6,770,693; and 6,680,351.) Although Doverphos® S-9228™ gives excellent color and melt flow stability during processing of LLDPE and LDPE, when used at moderate to high levels (over 250 ppm) it will plate-out on the processing equipment or plate-out on the plastic part after aging, both of which are undesirable.

The problem with plating-out on process equipment is that the there is a build up of residual phosphite on some of the processing parts thereby requiring that the process be stopped and the equipment cleaned. In the case of extruded LLDPE film or blown LLDPE film, the Doverphos® S-9228™ plates out on the rolls resulting in particles of S-9228™ being transferred to the film. Additionally, not only does the S-9228™ plate out on the processing equipment, but on aging some of the S-9228™ migrates to the surface of the polyethylene ("PE") film. In the case of PE stretch film the S-9228™ appears as a powder on the surface and prevents the stretch film from adhering to itself.

At least one prior art solution described in WO 2006/083642 A1, disclosed a method of reducing the plate-out by the incorporation of a dibenzylidene, with a clarifying agent during polypropylene processing by including the use of one or more co-additives. The co-additives used were selected from the group consisting of homopolymers of ethylene oxide, copolymers containing ethylene oxide segments, propylene oxide and polycaprolactone and derivatives and combinations.

Thus, there is a great need to find a way or process to be able to use solid diphosphites and monophosphites at higher levels in LLDPE and LDPE without the attendant problem of plate-out and/or bloom.

SUMMARY OF THE INVENTION

The invention herein described includes the use of a defined molecular weight range of polyalkylene glycols, including polyethylene glycols, polypropylene glycols and polycaprolactones which when used above a minimum concentration, can reduce and prevent the migration and/or plate-out of solid diphosphites and monophosphites such as Doverphos® S-9228™ (bis(2,4-dicumylphenyl)pentaerythritol diphosphite) or Doverphos® S-480 (tris(2,4-di-t-butylphenyl)phosphite) in polyolefins, e.g., low density polyethylene, linear low density polyethylene and polypropylene during processing and aging.

In one embodiment, the molecular weight range of polyethylene glycol (PEG) is from about 1,000 to 20,000, more preferably from about 2,000 to about 15,000, most preferably from about 4,000 to about 10,000, and in one preferred embodiment, is approximately 8000. PEG is added at a concentration which is effective compared to a composition with no added PEG. In another embodiment polypropylene glycol, the molecular weight range of (PPG) is from 400 to 8000 and more preferably 3000 to 4000. The PPG is added at a concentration which is effective compared to a composition with no PPG. In another embodiment, polycaprolactones (PCL) with molecular weight range of 400 to 15,000 are added, and more preferably with a molecular weight range from 2,000 to 8000. The PCL is added at a concentration which is effective compared to a composition with no PCL.

In one embodiment, the PEG, PPG, and PCL are added in an amount which is within approximately 150% of an amount of said diphosphite, alternatively within approximately 100% of the diphosphite, and in yet another alternative, within approximately 50% of said amount of diphosphite. In some applications, the added amounts will be essentially equal. Secondary additives may also be added, these additives selected from the group consisting of magnesium oxide, zinc oxide, calcium stearate, magnesium stearate, and hydrotalcite.

In another embodiment of the invention, blends of PEG, PPG and PCL, particularly are employed.

These and other objects of this invention will be evident when viewed in light of the detailed description and appended claims.

DETAILED DESCRIPTION OF THE INVENTION

The best mode for carrying out the invention will now be described for the purposes of illustrating the best mode known to the applicant at the time. The examples are illustrative only and not meant to limit the invention, as measured by the scope and spirit of the claims. As used in this application, "plate-out" is the migration of additives to manufacturing equipment during processing while "bloom" is the migration of additives to the surface of the polymer after aging.

Doverphos® S-9228™ is a high performance diphosphite that gives good melt flow stability and good color stability during polymer processing. Tables 1-3 give some of the performance data of S-9228™ compared to the general purpose solid monophosphite, Doverphos® S-480. Both formulas contained 400 ppm of Dovernox-10 (tetrakis methylene (3,5-di-t-butyl-4-hydroxyhydrocinnamate) methane) and 400 ppm of CaSt (calcium stearate). S-9228T is bis(2,4-dicumylphenyl)pentaerythritol diphosphite with less than 5% triisopropanolamine added by weight.

As used in this application, the phosphite additive S-9228™ (bis(2,4-dicumylphenyl)pentaerythritol diphosphite) is the following phosphite additive commercially available from Dover Chemical Corporation.

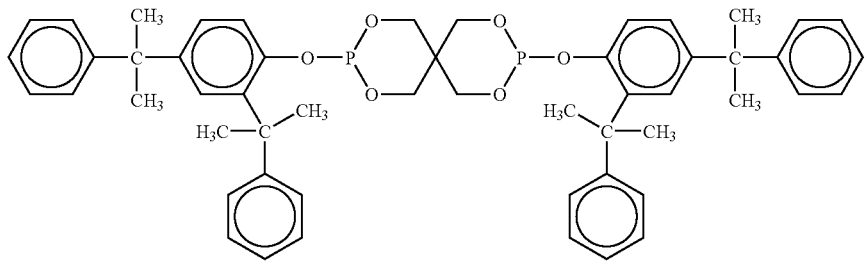

As used in this application, the phosphite additive S-480, also known as Irgafos® 168, (tris(2,4-di-t-butylphenyl) phosphite) is the following phosphite additive commercially available from Dover Chemical Corporation and others, e.g., Ciba Corporation.

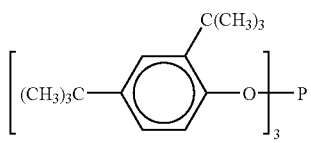

Also, as used in this application, poly(ethylene glycol) ("PEG"), and polypropylene glycol (PPG) also known as poly(ethylene oxide) ("PEO") or poly(propylene oxide) ("PPO") respectively, are polyethers and refers to an oligomer or polymer of ethylene oxide or propylene oxide and are typically liquids or low-melting solids, depending on their molecular weight. PEGs and PPGs are typically prepared by the polymerization of ethylene oxide or propylene oxide and are commercially available over a wide range of molecular weights from 300 g/mol to 10,000,000 g/mol. Different forms of PEG or PPG are also available dependent on the initiator used for the polymerization process. The most common of which is a monofunctional methyl ether PEG (methoxypoly(ethylene glycol)) or methyoxypolypropylene glycol, abbreviated mPEG and mPPG. PEGs and PPG are also available with different geometries. Branched polymers have 3 to 10 polyglycol chains emanating from a central core group. Star polymers have 10-100 polyglycol chains emanating from a central core group. Comb PEGs and PPGs have multiple polyglycol chains normally grafted to a polymer backbone.

PEG and PPG melting points vary depending on the Formula Weight of the polymer. PEG or PEO has the following chemical structure:

while PPG has the following chemical structure

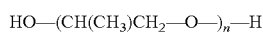

The numbers that are often included in the names of PEGs or PPGs indicate their average molecular weights, e.g. a PEG with n=9 would have an average molecular weight of approximately 400 Daltons and would be labeled PEG 400. Most PEGs include molecules with a distribution of molecular weights, i.e. they are polydisperse. The size distribution can be characterized statistically by its weight average molecular weight ($M_w$) and its number average molecular weight ($M_n$), the ratio of which is called the polydispersity index ($M_w/M_n$).

The performance of the diphosphite S-9228™ was compared and contrasted to the monophosphite S-480 in LLDPE, HDPE and PP as illustrated in Tables 1-3.

TABLE 1

Performance of S-9228 ™ Compared to S-480 in LLDPE

| Additive | YI Color Stability @230° C. | | | MFI Stability @230° C. | | |
|---|---|---|---|---|---|---|
| | 1st Pass | 3rd Pass | 5th Pass | 1st Pass | 3rd Pass | 5th Pass |
| S-9228 ™ (600 ppm) | −1.6 | −2.9 | −1.9 | 21.8 | 21.8 | 20.3 |
| S-480 (1200 ppm) | 0.2 | 3.1 | 5.0 | 22.6 | 22.2 | 20.8 |

TABLE 2

Performance of S-9228 ™ Compared to S-480 in HDPE

| Additive | YI Color Stability @230° C. | | | MFI Stability @230° C. | | |
|---|---|---|---|---|---|---|
| | 1st Pass | 3rd Pass | 5th Pass | 1st Pass | 3rd Pass | 5th Pass |
| S-9228T (500 ppm) | 2.0 | 4.2 | 5.6 | 27.9 | 29.9 | 30.2 |
| S-480 (1000 ppm) | 3.2 | 5.4 | 6.2 | 28.3 | 29.8 | 30.3 |

TABLE 3

Performance of S-9228 ™ Compared to S-480 in PP

| Additive | YI Color Stability @260° C. | | | MFI Stability @260° C. | | |
|---|---|---|---|---|---|---|
| | 1st Pass | 3rd Pass | 5th Pass | 1st Pass | 3rd Pass | 5th Pass |
| S-9228 ™ (400 ppm) | 4.3 | 7.9 | 8.3 | 16.0 | 21.0 | 27.0 |
| S-480 (800 ppm) | 6.0 | 8.5 | 10.0 | 17.0 | 24.0 | 30.0 |

As seen from the above experimental results, in general S-9228™ can be used at approximately one half the concentration levels of S-480 and still give excellent results. In low density polyethylene, like LLDPE, a high level of S-480 (about 800 to 1500 ppm) must be used to give stability for five passes in an extruder. The performance of phosphites is determined by running multi-pass extrusions, collecting the polymer after each pass. The color and melt flow index is then measured after the first, third and fifth pass through the extruder. The less change in color and melt flow, the better the performance of the phosphite. Typically a primary antioxidant is also used at levels of 200 to 1500 ppm in these multi-pass extrusion tests.

S-480 by itself, when used at levels required to give good performance, gives plate-out. Even S-9228™, which offers equivalent to superior performance at lower concentrations of the additive, exhibited plate-out. S-9228™ was added at 450 ppm in a LLDPE cast film application. On aging for one month, it was found that S-9228™ was blooming onto the surface of the LLDPE film. The bloom of S-9228™ affects the clarity of the film. It also negatively impacts film adhesion if it is a stretch film. Even S-9228™ added at levels as low as 300 ppm in LLDPE exhibited bloom. It is interesting to note that the blooming and plate-out problems do not occur in HDPE. Many co-additives were tried with S-9228™ to see if it was possible to eliminate the migration or bloom. These included various esters and plasticizers and several polyethylene glycols.

The procedure for evaluating plate-out or blooming which was employed was as follows. The phosphite additive e.g., S-9228™ by itself or with co-additives into LLDPE (obtained from Nova Chemicals Corporation or other LLDPE supplier) was blended using a Brabender bowl mixer at 220° C. and 45 rpm for five minutes. The polymer containing the additives was removed from the bowl and compression molded into 20 mil thick films at 180° C. for 5 minutes. The film was then cut into 4×4 inch squares and suspended in a 50° C. or 70° C. oven for several days. Each day the films were checked for bloom on the surface. Table 4 gives a list of some of phosphites at various levels. Table 5 gives the performance of these phosphites as a stabilizer and Table 6 gives results with regard to bloom.

TABLE 4

| Additive (ppm) | A | B | C | D | E | F |
|---|---|---|---|---|---|---|
| S-9228T | 650 | 550 | 450 | 350 | 325 | |
| S-480 | | | | | 325 | 1000 |
| DN 10 | 200 | 200 | 200 | 200 | 200 | 200 |

TABLE 5

| | A | B | C | D | E | F |
|---|---|---|---|---|---|---|
| Melt Flow (g/10 min) | | | | | | |
| 1st Pass | 4.27 | 4.40 | 4.28 | 4.27 | 4.31 | 4.24 |
| 3rd Pass | 3.92 | 3.99 | 3.75 | 3.52 | 3.82 | 3.60 |
| 4th Pass | 3.50 | 3.59 | 3.31 | 3.01 | 3.38 | 3.14 |
| 5th Pass | 2.90 | 3.07 | 2.69 | 2.43 | N/A | N/A |
| Color (YI) | | | | | | |
| 1st Pass | −3.0 | −2.8 | −2.7 | −1.7 | −2.2 | −1.9 |
| 3rd Pass | −0.5 | 0 | 1.0 | 0.1 | 0.2 | −0.1 |
| 4th Pass | 0.1 | 0.7 | 1.2 | 0.8 | 1.6 | 0.7 |
| 5th Pass | 0.4 | 1.5 | 1.7 | 1.7 | 2.2 | 1.3 |

TABLE 6

Phosphite Migration Results in over at 70° C. (LLDPE)

| | 3 Days | | 5 Days | |
|---|---|---|---|---|
| Formula | Thin film | 20 mil | Thin film | 20 mil |
| A | 0 | 0 | 1 | 1 |
| B | 0 | 0 | 1 | 1 |
| C | 0 | 0 | 1 | 1 |
| D | 0 | 0 | 0.5 | 1 |
| E | 0 | 0 | 1 | 1 |
| F | 1 | 0 | 1 | 0 |

The data indicates that even down to a level of 350 ppm, S-9228™ after 5 days shows some evidence of migration or bloom from the LLDPE.

Another study was conducted on the degree of migration (bloom) as a function of S-9228™ concentration in LLDPE and as a function of temperature, the results of which are shown in Table 7. Additives were weighed separately from the resin LLDPE (which contained 711 ppm of S-480). LLDPE was added to a Brabender Bowl Mixer at temperature of 225° C. Once resin was fused, the additives were added. The compound was mixed for about 2 minutes. The compound was removed from the bowl and compression molded into films and plaques (20 mil) for compatibility testing at the following temperatures: 70° C., 50° C. and room temperature. In the tables, the following rating was employed: 0—No Bloom; 1—Very Slight Bloom; 2—Slight Bloom; 3—Moderate Bloom; and 4—Heavy Bloom.

TABLE 7

Bloom as a function of amount of added S-9228 ™

| Additive | | Days Exposed at 70° C. | | | | |
|---|---|---|---|---|---|---|
| S-480 (ppm) | S-9228 ™ (ppm) | 1 | 5 | 7 | 14 | 21 |
| 711 | | 0 | 0 | 1 | 0 | 0 |
| 711 | 200 | 0 | 1 | 1 | 1 | 2 |
| 711 | 250 | 0 | 1 | 1 | 2 | 2 |
| 711 | 300 | 0 | 1 | 2 | 2 | 2 |
| 711 | 350 | 0 | 1 | 2 | 2 | 2 |
| 711 | 450 | 0 | 1 | | 3 | 3 |
| 761 | | 0 | 0 | 1 | 1 | 1 |
| | | Days Exposed at 50° C. | | | | |
| 711 | | 0 | 0 | 0 | 0 | 0 |
| 711 | 200 | 0 | 0 | 0 | 1 | 1 |
| 711 | 250 | 0 | 0 | 0 | 1 | 1 |
| 711 | 300 | 0 | 0 | 1 | 1 | 1 |
| 711 | 350 | 0 | 1 | 1 | 1 | 2 |
| 711 | 450 | 0 | 1 | 1 | 1 | 2 |
| 761 | | 0 | 0 | 0 | 0 | 1 |
| | | Days Exposed at R.T. | | | | |
| 711 | | 0 | 0 | 0 | 0 | 0 |
| 711 | 200 | 0 | 0 | 0 | 0 | 0 |
| 711 | 250 | 0 | 0 | 0 | 0 | 0 |
| 711 | 300 | 0 | 0 | 0 | 0 | 0 |
| 711 | 350 | 0 | 0 | 0 | 0 | 0 |
| 711 | 450 | 0 | 0 | 0 | 0 | 1 |
| 761 | | 0 | 0 | 0 | 0 | 0 |

The results show that even the addition of S-9228™ at 200 ppm S-9228™, some migration (bloom) will occur after 21 days at 70° C. Minimal migration (bloom) occurs with the control.

A further study was performed to evaluate several additives to determine if a reduction could be achieved for the migration of S-9228™ in LLDPE. The following procedure was employed: Additives were weighed separate from the resin followed by adding the resin to the Brabender Bowl Mixer when temperatures reached 225° C. Once the resin had fused, the additives were added and the materials were mixed for 2 minutes. The compound was removed from the bowl and compression molded into thin films for analytical testing and 20 mil plaques for compatibility testing. Each formulation was compounded 4 times in order to produce enough material for compression molding plaques.

As shown in Table 8, it has been discovered that higher molecular weight PEG gives the best results in preventing bloom. Several different molecular weight PEGs were evaluated including 400, 600, 1000, 1500 and 8000. Of the polyethylene glycols tested, PEG 8000 gave the best results. Many tests were then carried out to optimize the level of the PEG 8000 and the amount of S-9228™ that could be made compatible in the LLDPE resin.

TABLE 8

| | Material (ppm) | | | | | | |
|---|---|---|---|---|---|---|---|
| | A | B | C | D | E | F | G |
| LLDPE | 45 g | 45 g | 45 g | 45 g | 45 g | 45 g | 45 g |
| S-9228T | 750 | 750 | 750 | 750 | 750 | 750 | 750 |
| DN10 | 500 | 500 | 500 | 500 | 500 | 500 | 500 |
| | Additive | | | | | | |
| PEG 400 | 500 | | | | | | |
| PEG 600 | | 500 | | | | | |
| PEG 1000 | | | 500 | | | | |
| PEG/Stearate | | | | 500 | | | |
| PEG 1500 | | | | | 500 | | |
| PEG 8000 | | | | | | | 500 |

PEG/Stearate = monostearate ester of PEG 600

Plaques having a thickness of 20 mils were pressed out from each of the formulations compounded in Table 8 and the results summarized in Table 9. A plaque for each formulation was suspended in a 70° C. oven and checked every couple of days for blooming using a rating scale of 0 to 3 with 0 being no bloom and 3 being complete bloom.

TABLE 9

Results of Bloom Study - 70° C. Migration of S-9228 ™ to Film Surface

| Formula | Additive | Results | Rating (0 - no bloom to 3 - complete bloom) |
|---|---|---|---|
| A | None | Migration | 7 days (2) 14 days (3) |
| B | PEG 400 | Complete exudation | |
| C | PEG 600 | Complete exudation | |
| D | PEG 1000 | Complete exudation | |
| E | PEG/Stearate | Complete exudation | |
| F | PEG 1500 | Complete exudation | |
| G | PEG 8000 | Minor migration | 4 days (1), 7 days (1), 14 days (2.5) |

The optimum level of PEG 8000 to use with S-9228™, to prevent migration, was determined by running some experiments where a relatively high level of S-9228™ (450 ppm) in LLDPE was tested with various levels of the PEG 8000. The LLDPE resin used contained 450 ppm S-9228™ and 300 ppm of the S-480 (Base* formulation). The various compounds were prepared as described previously using a Brabender bowl mixer, the resulting compounds were pressed into 20 mil plaques and then aged in a 70° C. oven. The results are summarized in Table 10.

TABLE 10

| | Days | | | | | | |
|---|---|---|---|---|---|---|---|
| Compound LLDPE | 1 | 3 | 4 | 8 | 14 | 16 | 22 |
| Base* | 1 | 2 | 2 | 2 | 2 | 2 | 2 |
| Base* + 100 ppm PEG 8000 | 2 | 3 | 3 | 3 | 4 | 4 | 4 |
| Base* + 200 ppm PEG 8000 | 1 | 1 | 2 | 2 | 2 | 3 | 3 |
| Base* + 300 ppm PEG 8000 | 1 | 1 | 2 | 2 | 2 | 2 | 2 |
| Base* + 400 ppm PEG 8000 | 1 | 1 | 1 | 1 | 1 | 1 | 1 |
| Base* + 500 ppm PEG 8000 | 1 | 1 | 1 | 1 | 1 | 1 | 1 |

0-no bloom; 1-very slight bloom; 2-slight bloom; 3-moderate bloom; and 4-heavy bloom.

The data shows that for S-9228™ added at 450 ppm to the polymer, a 400 to 500 ppm level of PEG 8000 is needed to stop migration.

The addition of the PEG 8000 does result in a slightly darker color compared to no added PEG. The PEG 8000 does not seem to affect the melt flow stability. Table 11 below shows these results in which the Control was LLDPE containing 300 ppm S-480 & 450 ppm S-9228™.

TABLE 11

| | YI Color Stability @220° C. | | | MFI Stability @220° C. | | |
|---|---|---|---|---|---|---|
| Additive | 1st Pass | 3rd Pass | 5th Pass | 1st Pass | 3rd Pass | 5th Pass |
| Control | −1.5 | −1.0 | −0.3 | 2.8 | 2.6 | 2.0 |
| Control + 500 ppm PEG 8000 | −1.0 | 0.2 | 1.0 | 2.8 | 2.6 | 2.2 |

It was found that the addition of MgO could improve the color when used with the PEG 8000 as illustrated in the compositions made in accordance with Table 12. The formulations of Table 12 were compounded in a Brabender bowl mixer for 15 minutes at 200° C., plaques were pressed and used to measure color using the YI index.

TABLE 12

| | Additive (ppm) | | | | |
|---|---|---|---|---|---|
| | A | B | C | D | E |
| LLDPE | 45 g | 45 g | 45 g | 45 g | 45 g |
| S-9228 ™ | — | 450 | 450 | 450 | 450 |
| PEG 8000 | — | — | 500 | 500 | 500 |
| MgO | — | — | — | 250 | — |
| MgSt | — | — | — | — | 250 |
| YI | 24 | 15 | 29 | 16 | 17 |

Making sure that MgO would not affect the migration of the S-9228™ in LLDPE, more tests were performed in which another set of material was compounded in the Brabender Bowl Mixer to be able to test compatibility. Two new PEGs with lower molecular weights were evaluated in the formulation to determine if they help to reduce the bloom of S-9228T. One formulation also contained magnesium oxide. This was used to determine if it would help to reduce the added color the PEGs give to the formulations. The following formulations were compounded as shown in Table 13.

The formulations were compounded using LLDPE at 160° C. and 45 RPM for 2 minutes. The material was then collected from the bowl and compression molded into plaques. These plaques were placed into a 70° C. oven to observe for compatibility. The following results were recorded in Table 13.

TABLE 13

| | Additive (ppm) | | | |
|---|---|---|---|---|
| | A | B | C | D |
| LLDPE | 45 g | 45 g | 45 g | 45 g |
| S-9228T | 450 | 450 | 450 | 450 |
| S-480 | 300 | 300 | 300 | 300 |
| PEG 8000 | 500 | 500 | | |
| MgO | | 250 | | |
| PEG 1000 | | | 500 | |
| PEG 1450 | | | | 500 |
| Bloom (days @ 70° C.) | | | | |
| 1 | 0 | 0 | 1 | 1 |
| 2 | 0 | 0 | 1 | 1 |
| 6 | 0 | 0 | 1 | 1 |
| 9 | 0 | 0 | 1 | 1 |
| 12 | 0 | 0 | | 1 |

The data in Table 13 shows that MgO at 250 ppm did not affect migration also shows that some lower Molecular Weight polyethylene glycols were not as effective as the higher molecular weight polyethylene glycols, e.g., see PEG 8000.

Other additives were evaluated to see if they could improve the color of LLDPE, S-9228™ and the PEG 8000. These other additives included CaSt (calcium stearate), ZnO (zinc oxide) DHT4A (hydrotalcite) and MgSt (magnesium stearate) as shown in Table 14. The above formulations were mixed in Brabender Bowl Mixer for 20 minutes at 225° C. and compression molded plaques were prepared on each and then color YI measured. The results show again that MgO gives the best improvement in color.

TABLE 14

| | Additive (ppm) | | | | | | | |
|---|---|---|---|---|---|---|---|---|
| | A | B | C | D | E | F | G | H |
| LLDPE | 45 g | 45 g | 45 g | 45 g | 45 g | 45 g | 45 g | 45 g |
| S-9228 ™ | | 450 | 450 | 450 | 450 | 450 | 450 | 450 |
| PEG 8000 | | | 500 | 500 | 500 | 500 | 500 | 500 |
| MgO | | | | 250 | | | | |
| CaSt | | | | | 250 | | | |
| ZnO | | | | | | 250 | | |
| DHT4A | | | | | | | 250 | |
| MgSt | | | | | | | | 250 |
| YI (after mixing 20 minutes @225° C.) | 9.1 | 8.9 | 14.2 | 9.4 | 12.0 | 15.8 | 14.2 | 11.6 |

While S-9228™ can used at relatively low levels in LLDPE, it is recognized that S-480 needs to be used at very high levels, typically over 1000 ppm in LLDPE in order to give good MFI and color. S-480 will bloom at these high levels. It has been discovered that the addition of PEG 8000 will improve (i.e., reduce) the bloom and plate-out problem of S-480.

A series of experiments were performed to evaluate the compatibility of S-480 in NOVA Chemicals Corporation LLDPE resin with PEG 8000 to determine if polyethylene glycol would work in the same manner as with S-9228™ and to determine at what level the S-480 will exude out of the LLDPE. The material was compounded in a bowl mixer at 220° C. and 45 RPM for 5 minutes each. The following formulations were used and summarized in Table 15.

All of the material that was compounded was removed from the bowl mixer and compression molded into 20 mil thick films. These films were cut into 4×4 inch plaques and placed in a 50° C. oven to observe for compatibility. The samples were looked at periodically over a couple of weeks to determine if the PEG 8000 helps to reduce or eliminate the exudation.

After 16 days @ 50° C. it was decided to increase the temperature to 70° C. to force exudation. Compatibility was observed periodically with the following observations as illustrated in Table 15.

TABLE 15

| | Additive (ppm) | | | | | |
|---|---|---|---|---|---|---|
| | A | B | C | D | E | F |
| LLDPE | 45 g | 45 g | 45 g | 45 g | 45 g | 45 g |
| S-480 | 600 | 850 | 1100 | 1100 | 1100 | 1100 |
| PEG 8000 | | | | 550 | 700 | 1000 |
| Bloom (days at 50° C.) | | | | | | |
| 1 | 0 | 0 | 0 | 0 | 0 | 0 |
| 3 | 0 | 0 | 0 | 0 | 0 | 0 |
| 6 | 0 | 0 | 0.5 | 0 | 0 | 0 |
| 8 | 0.5 | 0.5 | 0.5 | 0 | 0 | 0 |
| 13 | 0.5 | 0.5 | 0.5 | 0 | 0 | 0 |
| 16 | 0.5 | 0.5 | 0.5 | 0 | 0 | 0 |
| Bloom (after 16 days at 50° C. and 4 days at 70° C.) | | | | | | |
| 20 | 1 | 1 | 1 | 0 | 0 | 0 |

The use of PEG 8000 stops or at least minimizes the plate-out (bloom) of S-480 in LLDPE.

Polypropylene glycol and polycaprolactones were also evaluated to see if they could prevent the blooming of S9228 in polymers especially in LLDPE. In this evaluation we used an improved method for determining migration to the surface. The initial gloss of plaques was read and then the gloss was read after aging in oven over time. If migration occurs, the gloss goes down drastically if there is not migration the gloss remains the same or decreases very little. Table 16 shows the results of the evaluation of several PCLs, and PPG.

All formulations were compounded in the Brabender Bowl Mixer at 160° C. for 2 minutes after the additives were added to the bowl mixer. Plaques were pressed and placed into a 70° C. oven. Gloss was measured as a way to track compatibility. A change in gloss measurement indicates that there is exudation on the surface of the plaque. The greater the change in gloss the greater the amount of exudate present. Where there is not a value for gloss, it indicates that a significant change in gloss occurred (excessive exudation) from the previous inspection and testing was ceased for that particular formulations. Each formulation was also tested for yellowness index. Gloss measurements were performed using a BYK Gardner micro-gloss 60° meter per ASTM D 2457.

A gloss meter is used to measure gloss on plaques that have been placed in the oven. Each plaque is placed onto brown felt. A calibration is run each time the gloss meter is turned on. Three measurements are taken at three different locations on each plaque. The gloss meter records each of these measurements are reports the average of these measurements. These measurements are tracked over time and change in gloss is observed.

TABLE 16

Migration test using gloss measurements after aging processed with NOVA LLDPE resin

| Composition (ppm-compound/ppm-compound) | Gloss: | | | |
|---|---|---|---|---|
| | Day 0 | Day 8 | Day 18 | Day 132 |
| No Additive | 90.6 | 84.3 | 83.9 | 82.6 |
| 650-S9228T | 90.2 | 77.7 | — | — |
| 650-S9228T/500-PPG3500 | 93.3 | 90 | 90.1 | 90.4 |
| 650-S9228T/750-PPG3500 | 87.9 | 86.6 | 86.9 | 85.3 |
| 650-S9228T/500-PCL10000 | 86.3 | 85.8 | 84.3 | 83.9 |
| 650-S9228T/750-PCL10000 | 87.8 | 88.7 | 87 | 88 |
| 650-S9228T/500-PCL2000 | 86.6 | 85.5 | 83.5 | 80.5 |
| 650-S9228T/750-PCL2000 | 82.8 | 80.2 | 84.7 | 76.1 |
| 650-S9228T/500-PCL-THF | 93.9 | 89.8 | 90.3 | 87.9 |
| 650-S9228T/750-PCL-THF | 92.3 | 89.8 | 90.3 | 88.3 |
| Color: YI Yellowness index | | | | |
| No Additive | 3.2 | 2 | | −0.6 |
| 650-S9228T | 1.3 | 1.3 | | — |
| 650-S9228T/500-PPG3500 | 5.4 | 2.8 | | 10.3 |
| 650-S9228T/750-PPG3500 | 3.1 | 2.4 | | 2.2 |
| 650-S9228T/500-PCL10000 | 4.6 | 3.6 | | −0.2 |
| 650-S9228T/750-PCL10000 | 2.6 | 2.8 | | 2.3 |
| 650-S9228T/500-PCL2000-DIOL | 4.9 | 4.2 | | −0.4 |
| 650-S9228T/750-PCL2000-DIOL | 0 | −0.9 | | 0.9 |
| 650-S9228T/500-PCL-THF | 1.4 | −0.4 | | 8.0 |
| 650-S9228T/750-PCL-THF | 0.3 | −1.0 | | 0.5 |

Table 17 give the results using an EXXON LLDPE comparing some polycaprolactones to the PEG8000. PEG 8000 was used since it gave the best results for the PEGs.

TABLE 17

Migration test using gloss measurements after aging.

| Additive | Gloss | |
|---|---|---|
| Amount - Type | Day 0 | Day 114 |
| 500 - 2043PCL400 | 81.3 | 65.6 |
| 750 - 2043PCL400 | 76.7 | 69.2 |
| 500 - 2047APCL400A | 76 | 66.2 |
| 750 - 3047APCL400A | 73 | 61.4 |
| 500 - 2403DPCL4000 | 76.6 | 79.3 |
| 750 - 2403DPCL4000 | 84.5 | 84.9 |
| 500 - 2803PCL8000 | 79.6 | 81.4 |
| 750 - 2803PCL8000 | 78.8 | 80.2 |
| 800 - PEG8000 | 87.6 | 84.2 |
| 1000 - PEG8000 | 88.2 | 86.2 |
| Color, YI yellowness Index | | |
| 500 - 2043PCL400 | 8 | 3.6 |
| 750 - 2043PCL400 | 1.4 | −3.5 |
| 500 - 2047APCL400A | 1.9 | −3.6 |
| 750 - 2047APCL400A | 1 | −3.7 |
| 500 - 2403DPCL4000 | 1.9 | −2.0 |
| 750 - 2403DPCL4000 | 6.2 | 1.7 |
| 500 - 2803PCL8000 | 2.6 | −1.5 |

TABLE 17-continued

Migration test using gloss measurements after aging.

| Additive | Gloss | |
|---|---|---|
| Amount - Type | Day 0 | Day 114 |
| 750 - 2803PCL8000 | 0.9 | −2.0 |
| 800 - PEG8000 | 4.1 | −1.6 |
| 1000 - PEG8000 | −1.1 | −5.4 |

These formulations were processed with EXXON LLDPE resin, all formulation contain 650 ppm of S9228T ((bis(2,4-dicumylphenyl)pentaerythritol diphosphite)+triisopropanol amine).

As used hereinabove,
PCL 2043 400 is Perstorp CAPA 2043, a low 400, MW linear diol, MP 0 to −10° C., viscosity at 60° C.-40 poise;
PCL 2047A 400A is Perstorp 2047A, a low 400 MW premium grade, 0 to −10° C. mp, viscosity at 60° C.-40 poise;
PCL 2403 D4000 is Perstorp 2403D premium grade linear diol from capolactone, MW 4000, 55 to 60° C. mp, viscosity 1670 poise at 60° C.;
PCL 2803 8000 is Perstorp 2803, linear, 8000 MW, MP 55 to 60° C. and viscosity at 60° C. of 8600 poise;
PCL 10000 from Aldrich, 10,000 MW, mp 60° C.;
PCL 2000-DIOL from Aldrich, 2000 MW mp 36 to 48° C.;
PCL-THF- from Aldrich, a polycaprolactone-block-polytetrahydrofuran-block polycaprolactone mp 30-33° C.; and
PPG 3500 from Aldrich, poly(propylene glycol) MW 3500, viscous liquid at 25° C.-13000 poise at 25° C.

Therefore, what has been shown is that S-9228™ is a high performance phosphite giving excellent performance in stabilizing LLDPE during processing. But, at the levels required to give good stabilization (greater than 250 ppm), S-9228™ will bloom onto the surface of the polymer. In this discovery, it has been found that by using PEG 8000, or PPG 3500 or PCL 2000 to 10000 as a co-additive at a level of at least 500 ppm, the blooming of solid phosphites such as S-9228™, S-480, S-680, Ultranox® 626, PEP 36 or Irgafos® 12, can be minimized, if not prevented.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process to reduce bloom or plate-out of solid phosphites in polyolefins comprising the step of:
    adding an amount of a co-additive selected from the group consisting of polyalkylene glycol, polycaprolactone and blends thereof, to said polyolefin,
    said amount of said co-additive being no less than 50% of said solid phosphite, and
    a molecular weight of said co-additive being sufficient to reduce said bloom or plate-out of said solid phosphites in comparison to when no co-additive is added.

2. The process of claim 1 wherein
    said polyalkylene glycol is polyethylene glycol, and
    said molecular weight of said polyethylene glycol ranges from about 1,000 to 20,000.

3. The process of claim 2 wherein
said polyalkylene glycol is polyethylene glycol, and
said molecular weight of said polyethylene glycol ranges from about 2,000 to 15,000.

4. The process of claim 3 wherein
said polyalkylene glycol is polyethylene glycol, and
said molecular weight of said polyethylene glycol ranges from about 4,000 to 10,000.

5. The process of claim 1 wherein
said polyalkylene glycol is polypropylene glycol, and
said molecular weight of said polypropylene glycol ranges from about 400 to 8,000.

6. The process of claim 5 wherein
said polyalkylene glycol is polypropylene glycol, and
said molecular weight of said polypropylene glycol ranges from about 3,000 to 4,000.

7. The process of claim 1 wherein
said co-additive is polycaprolactone and said molecular weight of said polycaprolactone ranges from about 400 to 15,000.

8. The process of claim 7 wherein
said co-additive is polycaprolactone and said molecular weight of said polycaprolactone ranges from about 2,000 to 8,000.

9. The process of claim 1 wherein
said solid phosphite is selected from the group consisting of (bis(2,4-dicumylphenyl)pentaerythritol diphosphite), (tris (2,4-di-t-butylphenyl)phosphite), distearyl pentaerythritol diphosphite, bis-(2,4-di-t-butylphenyl)pentaerythritol diphosphite, bis-(2,6-di-t-butyl-4-methylphenyl)pentaerythritol diphosphite, and 2,2',2''-nitrilo[triethyl-tris[3,3',5,5'-tetra-tert-butyl-1,1'-biphenyl-2,2'-diyl]]phosphite.

10. The process of claim 2 wherein
said amount of said co-additive being no less than 100% of said solid phosphite.

11. The process of claim 10 wherein
said amount of said co-additive being no less than 150% of said solid phosphite.

12. The process of claim 1 wherein
said co-additive is polyethyethylene glycol having a molecular weight of at least approximately 8000, said polyethylene glycol added in an amount of at least about 400 ppm, and
said polyolefin is selected from the group consisting of linear low density polyethylene, low density polyethylene, medium density polyethylene and polypropylene, and
said solid phosphite is bis(2,4-dicumylphenyl)pentaerythritol diphosphite, said phosphite added in an amount of at least about 500 ppm.

13. The process of claim 1 wherein
said co-additive is polyethyethylene glycol having a molecular weight of at least approximately 8000, said polyethylene glycol added in an amount of at least about 400 ppm, and
said polyolefin is selected from the group consisting of linear low density polyethylene, low density polyethylene, medium density polyethylene and polypropylene, and
said solid phosphite is tris (2,4-di-t-butylphenyl)phosphite, said phosphite added in an amount of at least about 300 ppm.

14. The process of claim 1 wherein
said co-additive is selected from the group consisting of
polyethyethylene glycol having a molecular weight of at least approximately 8000, said polyethylene glycol added in an amount of at least about 250 ppm,
polypropylene glycol having a molecular weight of at least approximately 3500, said polypropylene glycol added in an amount of at least about 250 ppm,
polycaprolactone having a molecular weight of at least approximately 2000, said polycaprolactone added in an amount of at least about 250 ppm, and
blends of polyethylene glycol, polypropylene glycol, polycaprolactone,
said polyolefin is selected from the group consisting of linear low density polyethylene, low density polyethylene, medium density polyethylene and polypropylene, and
said solid phosphite is selected from the group consisting of (bis(2,4-dicumylphenyl)pentaerythritol diphosphite), (tris (2,4-di-t-butylphenyl)phosphite), distearyl pentaerythritol diphosphite, bis-(2,4-di-t-butylphenyl)pentaerythritol diphosphite, bis-(2,6-di-t-butyl-4-methylphenyl)pentaerythritol diphosphite, and 2,2',2''-nitrilo[triethyl-tris[3,3',5,5'-tetra-tert-butyl-1,1'-biphenyl-2,2'-diyl]]phosphite, said phosphite added in an amount of at least about 500 ppm.

\* \* \* \* \*